(12) United States Patent
Isozaki et al.

(10) Patent No.: US 8,039,575 B2
(45) Date of Patent: Oct. 18, 2011

(54) FLAME-RETARDANT POLYCARBONATE RESIN COMPOSITION, POLYCARBONATE RESIN MOLDED ARTICLE, AND METHOD FOR PRODUCING THE POLYCARBONATE RESIN MOLDED ARTICLE

(75) Inventors: Toshio Isozaki, Chiba (JP); Kouji Satou, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 147 days.

(21) Appl. No.: 12/445,739

(22) PCT Filed: Oct. 11, 2007

(86) PCT No.: PCT/JP2007/069848
§ 371 (c)(1),
(2), (4) Date: Apr. 16, 2009

(87) PCT Pub. No.: WO2008/047673
PCT Pub. Date: Apr. 24, 2008

(65) Prior Publication Data
US 2011/0003128 A1 Jan. 6, 2011

(30) Foreign Application Priority Data
Oct. 16, 2006 (JP) .................................. 2006-280967

(51) Int. Cl.
*C08G 64/00* (2006.01)
*C08G 63/528* (2006.01)
(52) U.S. Cl. ........................................ 528/196; 528/198
(58) Field of Classification Search .................. 528/196, 528/198
See application file for complete search history.

(56) References Cited

U.S. PATENT DOCUMENTS

| | | | | |
|---|---|---|---|---|
| 5,449,710 | A * | 9/1995 | Umeda et al. ................. | 524/165 |
| 5,451,632 | A * | 9/1995 | Okumura et al. .............. | 524/537 |
| 5,510,414 | A | 4/1996 | Okamoto et al. | |
| 6,987,141 | B2 * | 1/2006 | Okamoto et al. .............. | 524/494 |
| 2004/0030044 | A1 | 2/2004 | Okamoto et al. | |
| 2007/0179237 | A1 | 8/2007 | Sekine | |

FOREIGN PATENT DOCUMENTS

| | | |
|---|---|---|
| EP | 0567 655 B1 | 3/1999 |
| JP | 5 140461 | 6/1993 |
| JP | 5 155638 | 6/1993 |
| JP | 7 118514 | 5/1995 |
| JP | 9 165506 | 6/1997 |
| JP | 2000 063653 | 2/2000 |
| JP | 2006 022235 | 1/2006 |
| JP | 2006 22236 | 1/2006 |
| JP | 2006 169324 | 6/2006 |
| JP | 2006 199732 | 8/2006 |
| JP | 2006 249291 | 9/2006 |
| WO | 2005 110695 | 11/2005 |

OTHER PUBLICATIONS

U.S. Appl. No. 12/742,310, filed May 11, 2010, Isozaki, et al.
U.S. Appl. No. 12/745,170, filed May 27, 2010, Isozaki, et al.
U.S. Appl. No. 12/739,548, filed Jun. 23, 2010, Isozaki, et al.
U.S. Appl. No. 12/739,448, filed Jul. 2, 2010, Isozaki, et al.
U.S. Appl. No. 12/445,302, filed Apr. 13, 2009, Isozaki, et al.
U.S. Appl. No. 12/445,688, filed Apr. 15, 2009, Isozaki, et al.
U.S. Appl. No. 12/747,688, filed Jun. 11, 2010, Isozaki, et al.
U.S. Appl. No. 12/747,704, filed Jun. 11, 2010, Isozaki, et al.
Chinese Office Action issued on Nov. 16, 2010, in Chinese Patent Application No. 200780038183.4.

* cited by examiner

*Primary Examiner* — Terressa Boykin
(74) *Attorney, Agent, or Firm* — Oblon, Spivak, McClelland, Maier & Neustadt, L.L.P.

(57) ABSTRACT

Provided are a polycarbonate resin composition containing a glass filler, which is excellent in transparency, strength, and heat resistance and provided with high flame retardancy even without using a flame retardant, and a polycarbonate resin molded article obtained by molding the resin composition. The flame-retardant polycarbonate resin composition contains a combination including (A) 55 to 95 mass % of an aromatic polycarbonate resin containing a polycarbonate-polyorganosiloxane copolymer and (B) 45 to 5 mass % of a glass filler having a refractive index smaller or larger than a refractive index of the aromatic polycarbonate resin by 0.002 or less, and (C) 0.05 to 20.0 parts by mass of a silicone compound having a reactive functional group with respect to 100 parts by mass of the combination. The polycarbonate resin molded article has a thickness of 0.3 to 10 mm which is obtained by molding the composition.

22 Claims, No Drawings

FLAME-RETARDANT POLYCARBONATE RESIN COMPOSITION, POLYCARBONATE RESIN MOLDED ARTICLE, AND METHOD FOR PRODUCING THE POLYCARBONATE RESIN MOLDED ARTICLE

TECHNICAL FIELD

The present invention relates to a flame-retardant polycarbonate resin composition, a polycarbonate resin molded article using the composition, and a method for producing the molded article, and more specifically, to a polycarbonate resin composition containing a glass filler, which is excellent in transparency, strength, and heat resistance, and provided with high flame retardancy even without using a flame retardant, a polycarbonate resin molded article obtained by molding the resin composition so as to have a thickness of 0.3 to 10 mm, and a method for producing the molded article.

BACKGROUND ART

Polycarbonate resin molded articles have been widely used as, for example, industrial transparent materials in the fields of electricity and electronics, machinery, automobiles, and the like or optical materials for lenses, optical disks, and the like because each of the articles is excellent in transparency and mechanical strength. When an additionally high mechanical strength is needed, a glass filler or the like is added to each of the articles to strengthen the article.

Glass fibers each constituted of glass generally called an E glass have been used as the glass filler. However, the refractive index of the E glass at a sodium D line (nD, hereinafter simply referred to as "refractive index") is somewhat small, specifically, about 1.555, though, the refractive index of a polycarbonate resin is 1.580 to 1.590. Accordingly, when the glass filler is added to a polycarbonate resin composition in an amount needed for an increase in mechanical strength of the composition, the following problem arises: the resultant E glass-reinforced polycarbonate resin composition cannot maintain its transparency owing to a difference in refractive index between the filler and the polycarbonate resin of which the composition is formed, with the result that the composition cannot maintain its transparency.

In order to solve the problem above, various proposals have been made until now.

For example, (1) a polycarbonate resin composition containing a polycarbonate resin using a product of a reaction between a hydroxyaralkyl alcohol and lactone as a terminal stopper and a glass-based filler having a refractive index smaller or larger than that of the polycarbonate resin by 0.01 or less (see Patent Document 1), (2) a polycarbonate resin composition containing a polycarbonate resin, a glass fiber having a refractive index smaller or larger than that of the polycarbonate resin by 0.015 or less, and polycaprolactone (see Patent Document 2), (3) a glass composition obtained by incorporating $ZrO_2$, $TiO_2$, BaO, and ZnO into a glass filler composition at a specific ratio so that the refractive index of the composition is close to that of a polycarbonate resin (see Patent Document 3), and (4) a polycarbonate resin composition having good transparency and high mechanical strength, and containing a polycarbonate resin, a specific glass ingredient, and a glass filler having a refractive index smaller or larger than that of the polycarbonate resin by 0.001 or less (see Patent Document 4) have been proposed.

However, the polycarbonate resin composition in the above section (1) is not practical because of the following reasons: when the glass-based filler is added in an amount needed for an increase in mechanical strength of the composition, the difference in refractive index at such level is not small enough for the addition to exert its effect, and a raw material used for the production of the polycarbonate resin is too expensive.

The polycarbonate resin composition in the above section (2) involves the following problem: reductions in heat resistance and mechanical characteristics of the composition are inevitable owing to the presence of polycaprolactone, though, the glass fiber can maintain its transparency even when the glass fiber has a refractive index smaller or larger than that of the polycarbonate resin by 0.015 or less.

Unless the content of each of $ZrO_2$, $TiO_2$, BaO, and ZnO in the glass composition in the above section (3) is appropriately adjusted, the glass will devitrify. As a result, even when the glass composition has a refractive index equal to that of the polycarbonate resin, a polycarbonate resin composition containing the glass composition may be unable to obtain transparency.

Further, the document disclosing the polycarbonate resin composition in the above section (4) does not refer to flame retardancy. Accordingly, unless flame retardancy is imparted to the composition, fields where the composition can be used will be limited.

Patent Document 1: JP 07-118514 A
Patent Document 2: JP 09-165506 A
Patent Document 3: JP 05-155638 A
Patent Document 4: JP 2006-022236 A

DISCLOSURE OF THE INVENTION

Problems to be Solved by the Invention

In view of such circumstances, an object of the present invention is to provide a polycarbonate resin composition containing a glass filler, which is excellent in transparency, strength, and heat resistance, and provided with high flame retardancy even without using a flame retardant, and a polycarbonate resin molded article obtained by molding the resin composition.

Means for Solving the Problems

The inventors of the present invention have made extensive studies with a view to achieving the object. As a result, the inventors have found that the object can be achieved with a flame-retardant polycarbonate resin composition having the following characteristics and a polycarbonate resin molded article obtained by molding the resin composition with a predetermined thickness: the composition contains an aromatic polycarbonate resin containing a copolymer with polyorganosiloxane, a glass filler having a refractive index smaller or larger than that of the aromatic polycarbonate resin by 0.002 or less, and a silicone compound having a reactive functional group at a predetermined ratio, and has a predetermined flame-retardant grade. The present invention has been completed on the basis of such finding.

That is, the present invention provides:
(1) a flame-retardant polycarbonate resin composition including a combination including (A) 55 to 95 mass % of an aromatic polycarbonate resin containing a polycarbonate-polyorganosiloxane copolymer and (B) 45 to 5 mass % of a glass filler having a refractive index smaller or larger than a refractive index of the aromatic polycarbonate resin by 0.002 or less, and (C) 0.05 to 2.0 parts by mass of a silicone compound having a reactive functional group with respect to 100 parts by mass of the combination;

(2) the flame-retardant polycarbonate resin composition according to the item (1), in which the aromatic polycarbonate resin as the component (A) contains 10 to 40 mass % of the polycarbonate-polyorganosiloxane copolymer;
(3) the flame-retardant polycarbonate resin composition according to the item (1), in which the polycarbonate-polyorganosiloxane copolymer contains a polyorganosiloxane moiety in a ratio of 0.3 to 5.0 mass %;
(4) the flame-retardant polycarbonate resin composition according to the item (1), in which the glass filler as the component (B) includes glass fibers and/or milled fibers;
(5) the flame-retardant polycarbonate resin composition according to the item (1), including 0.00001 to 0.01 part by mass of a colorant with respect to 100 parts by mass of the combination including the component (A) and the component (B);
(6) a polycarbonate resin molded article obtained by molding the flame-retardant polycarbonate resin composition according to any one of the items (1) to (5) to have a thickness of 0.3 to 10 mm;
(7) the polycarbonate resin molded article according to the item (6), in which the polycarbonate resin molded article is obtained by injection molding at a mold temperature of 120° C. or higher;
(8) the polycarbonate resin molded article according to the item (6), in which the polycarbonate resin molded article has a total light transmittance for visible light of 80% or more and a haze value of 40% or less;
(9) the polycarbonate resin molded article according to the item (6), in which the polycarbonate resin molded article has a 60° specular gloss of 90 or more; and
(10) a method for producing a polycarbonate resin molded article, including subjecting the flame-retardant polycarbonate resin composition according to any one of the items (1) to (5) to injection molding at a mold temperature of 120° C. or higher to produce a molded product having a thickness of 0.3 to 10 mm.

Effects of the Invention

According to the present invention, there can be provided a polycarbonate resin composition containing a glass filler, which is excellent in transparency, strength, and heat resistance, and provided with high flame retardancy even without using a flame retardant, a polycarbonate resin molded article obtained by molding the resin composition to have a thickness of 0.3 to 10 mm, and a method for producing the molded article.

BEST MODE FOR CARRYING OUT THE INVENTION

The flame-retardant polycarbonate resin (hereinafter abbreviated to "flame-retardant PC resin composition") of the present invention is characterized by including a combination including (A) 55 to 95 mass % of an aromatic polycarbonate resin containing a polycarbonate-polyorganosiloxane copolymer and (B) 45 to 5 mass % of a glass filler having a refractive index smaller or larger than a refractive index of the aromatic polycarbonate resin by 0.002 or less, and (C) 0.05 to 2.0 parts by mass of a silicone compound having a reactive functional group, with respect to 100 parts by mass of the combination. In the flame-retardant PC resin composition of the present invention, a flame retardancy determined by a flame retardancy evaluation method in conformance with UL94 can be 1.5 mmV-0.

In the flame-retardant PC resin composition of the present invention, as the aromatic polycarbonate resin as the component (A), an aromatic polycarbonate resin containing a polycarbonate-polyorganosiloxane copolymer (which may hereinafter be abbreviated as "PC-POS copolymer") is used. Specifically, there is preferably used an aromatic polycarbonate resin in which (a-1) an aromatic polycarbonate resin produced by a reaction between a dihydric phenol and a carbonate precursor (which may hereinafter be abbreviated as "general PC resin") and (a-2) a PC-POS copolymer are contained, and a content of the PC-POS copolymer is 10 to 40 mass %.

When the content of the PC-POS copolymer as the component (a-2) contained in the component (A) is 0.5 mass % or more, the PC resin composition can be provided with desired flame retardancy. The content of the PC-POS copolymer contained in the component (A) is more preferably 0.5 to 3 mass % and still more preferably 0.5 to 1.5 mass %.

A method of producing a general PC resin as the component (a-1) in the component (A) is not particularly limited, and resins produced by various conventionally known methods can each be used as the PC resin. For example, a resin produced from a dihydric phenol and a carbonate precursor by a solution method (interfacial polycondensation method) or a melt method (ester exchange method), that is, a resin produced by, for example, an interfacial polycondensation method involving causing the dihydric phenol and phosgene to react with each other in the presence of a terminal stopper or an ester exchange method involving causing the dihydric phenol and diphenyl carbonate or the like to react with each other in the presence of a terminal stopper can be used.

As the dihydric phenol, various examples are given. In particular, examples thereof include 2,2-bis(4-hydroxyphenyl)propane [bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkane, bis(4-hydroxyphenyl)oxide, bis(4-hydroxyphenyl)sulfide, bis(4-hydroxyphenyl)sulfone, bis(4-hydroxyphenyl)sulfoxide, and bis(4-hydroxyphenyl)ketone. In addition, hydroquinone, resorcin, and catechol can be also exemplified. One kind of those dihydric phenols may be used alone, or two or more kinds thereof may be used in combination. Of those, bis(hydroxyphenyl)alkanes are preferred, and bisphenol A is particularly preferred.

On the other hand, as the carbonate precursor, a carbonyl halide, carbonyl ester, or a haloformate, and the like are given. Specifically, phosgene, dihaloformate of a dihydric phenol, diphenyl carbonate, dimethyl carbonate, and diethyl carbonate are given.

It should be noted that the general PC resin may have a branched structure. As a branching agent, 1,1,1-tris(4-hydroxyphenyl)ethane, α, α', α''-tris(4-hydroxyphenyl)-1,3,5-triisopropylbenzene, phloroglycine, trimellitic acid, isatinbis(o-cresol), and the like are exemplified.

In the present invention, a viscosity average molecular weight (Mv) of the general PC resin used as the component (a-1) is generally 10,000 to 50,000, preferably 13,000 to 35,000, and more preferably 15,000 to 20,000.

The viscosity average molecular weight (Mv) is calculated by the following equation, after a limiting viscosity [η] is obtained by determining a viscosity of methylene chloride solution at 20° C. by using a Ubbelohde type viscometer.

$$[\eta]=1.23\times10^{-5}M_v^{0.83}$$

In the aromatic polycarbonate resin as the component (A), a PC-POS copolymer to be used as a component (a-2) is formed of a polycarbonate portion and a polyorganosiloxane portion. For example, the copolymer can be produced by: dissolving, in a solvent such as methylene chloride, chlorobenzene, or chloroform, a previously produced polycarbonate oligomer (hereinafter abbreviated as "PC oligomer") constituting the polycarbonate portion and polyorganosiloxane constituting the polyorganosiloxane portion (segment) and having a reactive group such as an o-allylphenol residue, a p-hydroxystyrene residue, or a eugenol residue at any one of its terminals; adding a caustic alkali aqueous solution of the dihydric phenol to the solution; and subjecting the mixture to an interfacial polycondensation reaction with a tertiary amine (such as triethylamine) or quaternary ammonium salt (such as trimethylbenzylammonium chloride) as a catalyst in the presence of a terminal stopper.

The PC oligomer to be used in the production of the PC-POS copolymer can be easily produced by causing the dihydric phenol and the carbonate precursor such as phosgene to react with each other, or by causing the dihydric phenol and the carbonate precursor such as a carbonate compound to react with each other in a solvent such as methylene chloride.

That is, the PC oligomer is produced by causing the dihydric phenol and the carbonate precursor such as phosgene to react with each other, or by causing an ester exchange reaction between the dihydric phenol and the carbonate precursor such as diphenyl carbonate in the solvent such as methylene chloride.

Further, examples of the carbonate compounds include diarylcarbonates such as diphenylcarbonate, and dialkylcarbonates such as dimethylcarbonate and diethylcarbonate.

The PC oligomer to be used in the production of the PC-POS copolymer may be a homooligomer using one kind of the dihydric phenol, or may be a co-oligomer using two or more kinds of dihydric phenols.

Further, the PC oligomer may be a thermoplastic, randomly branched oligomer obtained by using a polyfunctional aromatic compound and the above dihydric phenol in combination.

In this case, as a branching agent (polyfunctional aromatic compound), 1,1,1-tris(4-hydroxyphenyl)ethane, α,α',α"-tris(4-hydroxyphenyl)-1,3,5-triisopropylbenzene, 1-[α-methyl-α-(4'-hydroxyphenyl) ethyl]-4-[α',α'-bis(4"-hydroxy phenyl)ethyl]benzene, phloroglycine, trimellitic acid, isatinbis(o-cresol), and the like are exemplified.

The PC-POS copolymer is disclosed, for example, in JP 03-292359 A, JP 04-202465 A, JP 08-81620 A, JP 08-302178 A, and JP 10-7897 A.

The PC-POS copolymer to be used is preferably such that the degree of polymerization of the polycarbonate portion is about 3 to 100, and the degree of polymerization of the polyorganosiloxane portion is about 2 to 500.

In addition, the content of the polyorganosiloxane portion in the PC-POS copolymer is 0.3 to 5.0 mass %, or preferably 0.5 to 4.0 mass % from the viewpoint of, for example, a balance between a flame retardancy-imparting effect on the flame-retardant PC resin composition to be obtained and the economical efficiency with which the polyorganosiloxane portion is obtained.

Further, a viscosity average molecular weight (Mv) of the PC-POS copolymer is generally 5,000 to 100,000, preferably 10,000 to 30,000, and particularly preferably 12,000 to 30,000.

Here, those viscosity average molecular weights (Mv) can be determined in the same manner as in the above general PC resin.

As a polyorganosiloxane portion of the PC-POS copolymer, a segment formed of polydimethylsiloxane, polydiethylsiloxane, polymethylphenylsiloxane, or the like is preferred and a polydimethylsiloxane segment is particularly preferred.

A molecular terminal group in the aromatic polycarbonate resin as the component (A) is not particularly limited, and a monovalent, phenol-derived group as a conventionally known terminal stopper may be used; a monovalent, phenol-derived group having an alkyl group having 10 to 35 carbon atoms is preferred. When the molecular terminal is a phenol-derived group having an alkyl group having 10 or more carbon atoms, a flame-retardant PC resin composition to be obtained has good flowability. In addition, when the molecular terminal is a phenol-derived group having an alkyl group having 35 or less carbon atoms, the flame-retardant PC resin composition to be obtained has good heat resistance and good impact resistance.

Examples of the monovalent phenol including an alkyl group having 10 to 35 carbon atoms include decyl phenol, undecyl phenol, dodecyl phenol, tridecyl phenol, tetradecyl phenol, pentadecyl phenol, hexadecyl phenol, heptadecyl phenol, octadecyl phenol, nonadecyl phenol, icosyl phenol, docosyl phenol, tetracosyl phenol, hexacosyl phenol, octacosyl phenol, triacontyl phenol, dotriacontyl phenol, and pentatriacontyl phenol.

The alkyl group may be present at any one of the o-, m-, and p-positions of each of those alkyl phenols with respect to the hydroxyl group; the alkyl group is preferably present at the p-position. In addition, the alkyl group may be a linear group, a branched group, or a mixture of them.

At least one substituent of each of the alkyl phenols has only to be the alkyl group having 10 to 35 carbon atoms, and the other four substituents are not particularly limited; each of the other four substituents may be an alkyl group having 1 to 9 carbon atoms, an aryl group having 6 to 20 carbon atoms, or a halogen atom, or each of the alkyl phenols may be unsubstituted except for the hydroxyl group and the alkyl group having 10 to 35 carbon atoms.

Only one of the terminals of the PC resin may be sealed with a monovalent phenol having the alkyl group having 10 to 35 carbon atoms, or each of both the terminals may be sealed with the phenol. In addition, terminals each denatured with the phenol account for preferably 20% or more, or more preferably 50% or more of all terminals from the viewpoint of an improvement in flowability of the flame-retardant PC resin composition to be obtained.

That is, the other may each be sealed with a hydroxyl group terminal or any one of the other terminal stoppers in the following description.

Here, examples of the other terminal stoppers include phenol, p-cresol, p-tert-butylphenol, p-tert-octylphenol, p-cumylphenol, p-nonylphenol, p-tert-amylphenol, bromophenol, tribromophenol, and pentabromophenol, which are commonly used in the production of the polycarbonate resin.

Of those, a halogen-free compound is preferred in view of environmental issues.

In the flame-retardant PC resin composition of the present invention, the aromatic polycarbonate resin as the component (A) can appropriately contain, in addition to the general PC resin as the component (a-1) and the PC-POS copolymer as the component (a-2), a copolymer such as a polyester-polycarbonate resin obtained by polymerizing polycarbonate in the presence of an ester precursor such as a bifunctional carboxylic acid such as terephthalic acid or an ester-forming derivative of the acid, or any other polycarbonate resin to such an extent that the object of the present invention is not impaired.

A difference between the refractive index of the glass filler to be used as the component (B) in the flame-retardant PC resin composition of the present invention and the refractive index of the aromatic polycarbonate resin as the component (A) in the flame-retardant PC resin composition must be 0.002 or less. When the difference in refractive index exceeds 0.002, the transparency of a molded article obtained by using the flame-retardant PC resin composition becomes insufficient. The difference in refractive index is preferably 0.001 or less; the refractive index of the glass filler is particularly preferably equal to that of the aromatic polycarbonate resin to be used as the component (A).

Glass of which such glass filler is constituted is, for example, a glass I or glass II having the following composition.

It is preferred that the glass I contain 50 to 60 mass % of silicon oxide ($SiO_2$), 10 to 15 mass % of aluminum oxide ($Al_2O_3$), 15 to 25 mass % of calcium oxide (CaO), 2 to 10 mass % of titanium oxide ($TiO_2$), 2 to 8 mass % of boron oxide ($B_2O_3$), 0 to 5 mass % of magnesium oxide (MgO), 0 to 5 mass % of zinc oxide (ZnO), 0 to 5 mass % of barium oxide (BaO), 0 to 5 mass % of zirconium oxide ($ZrO_2$) 0 to 2 mass % of lithium oxide ($Li_2O$), 0 to 2 mass % of sodium oxide ($Na_2O$), and 0 to 2 mass % of potassium oxide ($K_2O$), and have a total content of the lithium oxide ($Li_2O$), the sodium oxide ($Na_2O$), and the potassium oxide ($K_2O$) of 0 to 2 mass %.

On the other hand, it is preferred that the glass II contain 50 to 60 mass % of silicon oxide ($SiO_2$), 10 to 15 mass % of aluminum oxide ($Al_2O_3$), 15 to 25 mass % of calcium oxide (CaO), 2 to 5 mass % of titanium oxide ($TiO_2$), 0 to 5 mass % of magnesium oxide (MgO), 0 to 5 mass % of zinc oxide (ZnO), 0 to 5 mass % of barium oxide (BaO), 2 to 5 mass % of zirconium oxide ($ZrO_2$), 0 to 2 mass % of lithium oxide ($Li_2O$), 0 to 2 mass % of sodium oxide ($Na_2O$), and 0 to 2 mass % of potassium oxide ($K_2O$), be substantially free of boron oxide ($B_2O_3$), and have a total content of the lithium oxide ($Li_2O$), the sodium oxide ($Na_2O$), and the potassium oxide ($K_2O$) of 0 to 2 mass %.

The content of $SiO_2$ in each of the glass I and glass II is preferably 50 to 60 mass % from the viewpoints of the strength of the glass filler and solubility at the time of the production of each of the glasses. The content of $Al_2O_3$ is preferably 10 to 15 mass % from the viewpoints of the chemical durability of each of the glasses such as water resistance and solubility at the time of the production of each of the glasses. The content of CaO is preferably 15 to 25 mass % from the viewpoints of solubility at the time of the production of each of the glasses and the suppression of the crystallization of each of the glasses.

The glass I can contain 2 to 8 mass % of $B_2O_3$ like the E glass. In this case, the content of $TiO_2$ is preferably 2 to 10 mass % from the viewpoints of, for example, an improving effect on the refractive index of the glass and the suppression of the devitrification of the glass.

In addition, it is preferred that the glass II be substantially free of $B_2O_3$ like ECR glass composition, which is excellent in acid resistance and alkali resistance. In this case, the content of $TiO_2$ is preferably 2 to 5 mass % from the viewpoint of the adjustment of the refractive index of the glass. In addition, the content of $ZrO_2$ is preferably 2 to 5 mass % from the viewpoints of an increase in refractive index of the glass, an improvement in chemical durability of the glass, and solubility at the time of the production of the glass.

In each of the glass I and glass II, MgO is an arbitrary component, and can be incorporated at a content of about 0 to 5 mass % from the viewpoints of an improvement in durability of each of the glasses such as a tensile strength and solubility at the time of the production of each of the glasses. In addition, ZnO and BaO are also arbitrary components, and each of them can be incorporated at a content of about 0 to 5 mass % from the viewpoints of an increase in refractive index of each of the glasses and the suppression of the devitrification of each of the glasses.

In the glass I, $ZrO_2$ is an arbitrary component, and can be incorporated at a content of about 0 to 5 mass % from the viewpoints of an increase in refractive index of the glass and solubility at the time of the production of the glass.

In each of the glass I and glass II, $Li_2O$, $Na_2O$, and $K_2O$ as alkali components are arbitrary components, and each of them can be incorporated at a content of about 0 to 2 mass %. In addition, the total content of the alkali components is preferably 0 to 2 mass %. When the total content is 2 mass % or less, a reduction in water resistance of each of the glasses can be suppressed.

As described above, each of the glass I and glass II contains a small amount of alkali components, so a reduction in molecular weight of the flame-retardant PC resin composition due to the decomposition of the aromatic polycarbonate resin as the component (A) can be suppressed, and reductions in physical properties of an article molded out of the flame-retardant PC resin composition can be prevented.

Each of the glass I and glass II may contain, in addition to the glass components, for example, an oxide containing an element such as lanthanum (La), yttrium (Y), gadolinium (Gd), bismuth (Bi), antimony (Sb), tantalum (Ta), niobium (Nb), or tungsten (W) as a component for increasing the refractive index of the glass to such an extent that the spinning property, water resistance, and the like of the glass are not adversely affected. In addition, each of the glasses may contain an oxide containing an element such as cobalt (Co), copper (Cu), or neodymium (Nd) as a component for discoloring the yellow color of the glass.

In addition, the content of $Fe_2O_3$ as an impurity on an oxide basis in the glass raw materials to be used in the production of each of the glass I and glass II is preferably less than 0.01 mass % with respect to the entirety of the glass in order that the coloring of the glass may be suppressed.

The glass filler as the component (B) in the flame-retardant PC resin composition of the present invention can be obtained by: appropriately choosing a glass having a refractive index smaller or larger than that of the aromatic polycarbonate resin as the component (A) to be used by 0.002 or less from the glass I and glass II each having the above-mentioned glass composition; and forming the chosen glass into a desired shape.

The shape of the glass filler is not particularly limited, and glass fillers of various shapes such as glass fibers, milled fibers, a glass powder, glass flakes, and glass beads can each be used. One kind of them may be used alone, or two or more kinds of them may be used in combination; the glass fibers and/or the milled fibers are suitable from the viewpoint of a balance among, for example, the mechanical strength, impact resistance, transparency, and moldability of a molded article to be finally obtained.

The glass fibers can be obtained by employing a conventionally known spinning method for glass long fibers. For example, glass can be turned into fibers by employing any one of the various methods such as: a direct melt (DM) method involving continuously turning glass raw materials into glass in a melting furnace, introducing the resultant glass into a forehearth, and spinning the glass by attaching a bushing to the bottom of the forehearth; and a remelting method involving processing molten glass into a marble-, cullet-, or rod-like shape, remelting the resultant, and spinning the resultant.

Although the diameter of each of the glass fibers is not particularly limited, fibers each having a diameter of about 3 to 25 μm are preferably used in ordinary cases. When the diameter is 3 μm or more, irregular reflection is suppressed, whereby a reduction in transparency of the molded article can be prevented. In addition, when the diameter is 25 μm or less, the molded article to be obtained has a good strength.

The milled fibers can be obtained by employing a conventionally known production method for milled fibers. For example, strands of glass fibers can be turned into milled fibers by being pulverized with a hammer mill or ball mill. Although the fiber diameter and aspect ratio of each of the milled fibers are not particularly limited, milled fibers each having a fiber diameter of about 3 to 25 μm and an aspect ratio of about 2 to 150 are preferably used.

The glass powder can be obtained by a conventionally known production method. For example, a powder having a desired particle diameter can be obtained by: melting glass raw materials in a melting furnace; and loading the melt into water to water-granulate the melt or molding the melt into a sheet shape with a cooling roll and pulverizing the sheet. Although the particle diameter of the glass powder is not particularly limited, a glass powder having a particle diameter of about 1 to 100 μm is preferably used.

The glass flakes can be obtained by a conventionally known method. For example, flakes each having a desired aspect ratio can be obtained by: melting glass raw materials in a melting furnace; drawing the melt in a tubular shape to provide glass having a constant thickness; pulverizing the glass with a roll to provide a frit having a specific thickness; and pulverizing the frit. Although the thickness and aspect ratio of each of the glass flakes are not particularly limited, glass flakes each having a thickness of about 0.1 to 10 μm and an aspect ratio of about 5 to 150 are preferably used.

The glass beads can be obtained by a conventionally known production method. For example, glass beads each having a desired particle diameter can be obtained by: melting glass raw materials in a melting furnace; and spraying the melt with a burner. Although the particle diameter of each of the glass beads is not particularly limited, glass beads each having a particle diameter of about 5 to 300 μm are preferably used.

The surface of the glass filler is preferably treated with a coupling agent in order that the glass filler may show an increased affinity for the aromatic polycarbonate resin as the component (A), adhesiveness between the glass filler and the resin may be improved, and reductions in transparency and strength of the molded article due to the formation of voids in the glass filler may be suppressed.

A silane-based coupling agent, a borane-based coupling agent, an aluminate-based coupling agent, a titanate-based coupling agent, or the like can be used as the coupling agent. The silane-based coupling agent is particularly preferably used because adhesiveness between the aromatic polycarbonate resin and the glass can be improved.

Specific examples of the silane-based coupling agent include triethoxy silane, vinyltris(β-methoxyethoxy)silane, γ-methacryloxypropyl trimethoxy silane, γ-glycidoxypropyl trimethoxy silane, β-(1,1-epoxycylohexyl)nithyltrimethoxy silane, N-β-(aminoethyl)-γ-aminopropyl trimethoxy silane, N-β-(aminoethyl)-γ-aminopropylmethyl dimethoxyl silane, γ-aminopropyl triethoxysilane, N-phenyl-γ-aminopropyl trimethoxy silane, γ-mercaptopropyl trimethoxy silane, γ-chloropropyl trimethoxy silane, γ-aminopropyl trimethoxy silane, γ-aminopropyl tris(2-methoxy-ethoxy) silane, N-methyl-γ-aminopropyl trimethoxy silane, N-vinylbenzyl-γ-aminopropyl triethoxy silane, triaminopropyl trimethoxy silane, 3-ureidepropyl trimethoxy silane, 3-(4,5-dihydroimidazolyl) propyl triethoxy silane, hexamethyl disilazane, N,O-(bistrimethylsilyl)amide, and N,N-bis(trimethylsilyl)urea. Of those, preferred are amino silanes and epoxy silanes such as γ-aminopropyltrimethoxy silane, N-β-(aminoethyl)-γ-aminopropyl trimethoxysilane, γ-glycidoxypropyl trimethoxy silane, and β-(3,4-epoxycyclohexyl)ethyl trimethoxy silane.

The surface of the glass filler can be treated with such a coupling agent by an ordinary known method without any particular limitation. The surface treatment can be performed by an appropriate method depending on the shape of the filler; examples of the method include a sizing treatment method involving applying a solution or suspension of the above coupling agent in an organic solvent as the so-called sizing agent to the glass filler, a dry mixing method involving the use of a Henschel mixer, a super mixer, a Redige mixer, a V-type blender, or the like, a spray method, an integral blend method, and a dry concentrate method. The surface treatment is desirably performed by the sizing treatment method, the dry mixing method, or the spray method.

The flame-retardant PC resin composition of the present invention must contain the aromatic polycarbonate resin as the component (A) in an amount of 55 to 95 mass % and the glass filler as the component (B) in an amount of 45 to 5 mass % on the basis of the total amount of the components (A) and (B). When the content of the component (B) is less than 5 mass %, the component does not sufficiently exert an improving effect on the rigidity of the composition. In addition, when the content exceeds 45 mass %, the specific gravity of the composition increases, and the impact resistance of the composition reduces. The content of the component (A) and the content of the component (B) are preferably 60 to 90 mass % and 40 to 10 mass %, respectively, and more preferably 70 to 90 mass % and 30 to 10 mass %, respectively, from the viewpoints of, for example, the rigidity, the impact resistance, and the specific gravity.

The silicone compound having a reactive functional group is added as the component (C) to the flame-retardant PC resin composition of the present invention for the purpose of, for example, an additional improvement in flame retardancy of the composition.

Examples of the silicone compound having a reactive functional group as the component (C) (which may hereinafter be referred to as "reactive functional group-containing silicone compound") include polyorganosiloxane polymers and/or copolymers each having a basic structure represented by a general formula (1).

$$R^1_a R^2_b SiO_{(4-a-b)/2} \quad (1)$$

In the general formula (1), $R^1$ represents a reactive functional group. Examples of the functional group include an alkoxy group, an aryloxy group, a polyoxyalkylene group, a hydrogen group, a hydroxy group, a carboxyl group, a silanol group, an amino group, a mercapto group, an epoxy group, and a vinyl group. Of those, preferred are the alkoxy group, the hydroxy group, the hydrogen group, the epoxy group, and the vinyl group.

$R^2$ represents a hydrocarbon group having 1 to 12 carbon atoms. Examples of the hydrocarbon group include a linear or branched alkyl group having 1 to 12 carbon atoms, a cycloalkyl group having 5 to 12 carbon atoms, an aryl group having 6 to 12 carbon atoms, and an aralkyl group having 7 to 12 carbon atoms. Specific examples thereof include a methyl group, an ethyl group, an n-propyl group, an isopropyl group, various butyl groups, various pentyl groups, various hexyl groups, various octyl groups, a cyclopentyl group, a cyclohexyl group, a phenyl group, a tolyl group, a xylyl group, a benzyl group, and a phenetyl group.

a and b represent a number satisfying relationships of $0<a\leq3$, $0<b\leq3$, and $0<a+b\leq3$. When multiple $R^1$'s are present, the multiple $R^1$'s may be the same or different from one another. When multiple $R^2$'s are present, the multiple $R^2$'s may be the same or different from one another.

In the present invention, polyorganosiloxane polymers and/or copolymers each having multiple reactive functional groups of the same kind, and polyorganosiloxane polymers and/or copolymers each having multiple reactive functional groups of different kinds can be used in combination.

The polyorganosiloxane polymers and/or copolymers each having the basic structure represented by the general formula (1) each have a ratio of the number of its reactive functional groups ($R^1$) to the number of its hydrocarbon groups ($R^2$) of typically about 0.1 to 3, or preferably about 0.3 to 2.

Such reactive functional group-containing silicone compound, which is a liquid, powder, or the like, preferably shows good dispersibility in melting and mixing. For example, a liquid compound having a viscosity at room temperature of about 10 to 500,000 mm$^2$/s can be used.

The flame-retardant PC resin composition of the present invention has the following characteristics: even when the reactive functional group-containing silicone compound is a liquid, the compound is uniformly dispersed in the composition, and bleeds at the time of molding or to the surface of the molded article to a small extent.

The reactive functional group-containing silicone compound as the component (C) must be incorporated into the flame-retardant PC resin composition of the present invention at a content of 0.05 to 2.0 parts by mass with respect to 100 parts by mass of the combination including the aromatic polycarbonate resin as the component (A) and the glass filler as the component (B), the components (A) and (B) having the above content ratio. When the content of the component (C) is less than 0.05 part by mass, a preventing effect on dripping at the time of the combustion of the composition is insufficient. In addition, when the content exceeds 2.0 parts by mass, a screw starts to slide at the time of the kneading of the raw materials for the composition, so the raw materials cannot be successfully fed, and the ability of an apparatus including the screw to produce the composition reduces. The content of the component (C) is preferably 0.1 to 1.0 part by mass, or more preferably 0.2 to 0.8 part by mass from the viewpoints of the prevention of the dripping and productivity.

In addition to the components (A), (B), and (C), an antioxidant, a UV absorber, a release agent, an antistatic agent, a fluorescent bleach, a silane coupling agent (when the surface of the glass filler is treated by the dry mixing method), a colorant (having no concealing property), and the like can be appropriately incorporated into the flame-retardant PC resin composition of the present invention as required to such an extent that the object of the present invention is not impaired.

As the antioxidant, phenol-based antioxidants and phosphorous-based antioxidants are preferably used.

Examples of the phenol-based antioxidants include triethylene glycol-bis[3-(3-tert-butyl-5-methyl-4-hydroxyphenyl) propionate], 1,6-hexanediol-bis[3-(3,5-di-tert-butyl-4-hydroxyphenyl) propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), 3,5-di-tert-butyl-4-hydroxy-benzylphophonate-diethyl ester, tris(3,5-di-tert-butyl-4-hydroxybenzyl)isocyanurate, and 3,9-bis[1,1-dimethyl-2-[β-(3-tert-butyl-4-hydroxy-5-methylphenyl)propionyloxy]ethyl]-2,4,8,10-tetraoxaspiro(5,5)undecane.

Examples of the phosphorous-based antioxidants include triphenylphosphite, trisnonylphenylphosphite, tris(2,4-di-tert-butylphenyl)phosphite, tridecylphosphite, trioctylphopshite, trioctadecylphosphite, didecylmonophenyl phosphite, dioctylmonophenyl phosphite, diisopropylmonophenyl phosphite, momobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, and distearyl pentaerythritol diphosphite.

One kind of those antioxidants may be used alone, or two or more kinds of them may be used in combination. Such antioxidant is typically added in an amount of about 0.05 to 1.0 part by mass with respect to 100 parts by mass of the combination including the component (A) and the component (B).

As the UV absorber, benzotriazole-based UV absorber, triazine-based UV absorber, benzooxazine-based UV absorber, and benzophenone-based UV absorber may be used.

Examples of the benzotriazole-based UV absorber include 2-(2'-hydroxy-5'-methylphenyl)benzotriazole, 2-(2'-hydroxy-3'-(3,4,5,6-tetrahydrophthalimide methyl)-5'-methyphenyl)benzotriazole, 2-(2'-hydroxy-3',5'-di-tert-butylphenyl)benzotriazole, 2-(2'-hydroxy-5'-tert-octylphenyl)benzotriazole, 2-(3'-tert-butyl-5'-methyl-2'-hydroxyphenyl)-5-chlorobenzotriazole, 2,2'-methylenebis(4-(1,1,3,3-tetramethylbutyl)-6-(2H-benzotriazole-2-yl)phenol), 2-(2'-hydroxy-3',5'-bis(α,α-dimethylbenzyl)phenyl)-2H-benzotriazole, 2-(3',5'-di-tert-amyl-2'-hydroxyphenyl)benzotriazole, and 5-trifluoromethyl-2-(2-hydroxy-3-(4-methoxy-α-cumyl)-5-tert-butylphenyl)-2H-benzotriazole.

Of those, 2-(2'-hydroxy-5'-tert-octylphenyl)benzotriazole is preferred.

As the triazine-based UV absorber, TINUVIN 400 (trade name) (manufactured by Ciba Specialty Chemicals Inc.) which is a hydroxyphenyl triazine-based UV absorber is preferred.

Examples of the benzooxazine-based UV absorber include 2-methyl-3,1-benzooxazine-4-one, 2-butyl-3,1-benzooxazine-4-one, 2-phenyl-3,1-benzooxazine-4-one, 2-(1- or 2-naphthyl)-3,1-benzooxazine-4-one, 2-(4-biphenyl)-3,1-benzooxazine-4-one, 2,2'-bis(3,1-benzooxazine-4-one), 2,2'-p-phenylenebis(3,1-benzooxazine-4-one), 2,2'-m-phenylenebis(3,1-benzooxazine-4-one), 2,2'-(4,4'-diphenylene)bis(3,1-benzooxazine-4-one), 2,2'-(2,6- or 1,5-naphthalene)bis(3,1-benzooxazine-4-one), and 1,3,5-tris(3,1-benzooxazine-4-one-2-yl)benzene. Of those, 2,2'-p-phenylenebis(3,1-benzooxazine-4-one) is preferred.

Examples of the benzophenone-based UV absorber include 2-hydroxy-4-methoxybenzophenone, 2-hydroxy-4-n-octoxybenzophenone, 2-hydroxy-4-methoxy-2'-carboxybenzophenone, 2,4-dihydroxybenzophenone, and 2,2'-dihydroxy-4-methoxy benzophenone. Of those, 2-hydroxy-4-n-octoxybenzophenone is preferred.

One kind of those UV absorbers may be used alone, or two or more kinds of them may be used in combination. Such UV absorber is typically added in an amount of about 0.05 to 2.0 parts by mass with respect to 100 parts by mass of the combination including the component (A) and the component (B).

A higher fatty acid ester of a monohydric or polyhydric alcohol can be used as the release agent. Such higher fatty acid ester is preferably a partial or complete ester of a monohydric or polyhydric alcohol having 1 to 20 carbon atoms and a saturated fatty acid having 10 to 30 carbon atoms. Examples of the partial ester or the complete ester of a monohydric or polyhydric alcohol and the saturated fatty acid include monoglyceride stearate, monosorbitate stearate, monoglyceride behenate, pentaerythritol monostearate, pentaerythritol tetrastearate, propyleneglycol monostearate, stearyl stearate, palmityl palmitate, butyl stearate, methyl laurate, isopropyl palmitate, and 2-ethylhexyl stearate. Of those, monoglyceride stearate and pentaerythritol tetrastearate are preferably used.

One kind of those release agents may be used alone, or two or more kinds of them may be used in combination. Such release agent is typically added in an amount of about 0.1 to 5.0 parts by mass with respect to 100 parts by mass of the combination including the component (A) and the component (B).

As the antistatic agent, for example, a monoglyceride of the fatty acid having 14 to 30 carbon atoms, and more specifically, monoglyceride stearate, monoglyceride palmitate, or a polyamide polyether block copolymer may be used.

As the fluorescent bleach, for example, stilbene-based, benzoimidazole-based, naphthalimide-based, rhodamine-based, coumarin-based, and oxazine-based compounds are exemplified. More specifically, commercially-available products such as UVITEX (trade name, manufactured by Ciba Specialty Chemicals Inc.), OB-1 (trade name, manufactured by Eastman Chemical Company), TBO (trade name, manufactured by SUMITOMO SEIKA CHEMICALS CO., LTD.), Kcoll (trade name, manufactured by NIPPON SODA CO., LTD.), Kayalight (trade name, manufactured by NIPPON KAYAKU CO., LTD.), and Leucophor EGM (trade name, manufactured by Clariant Japan) may be used.

Further, as the colorant, a bluing agent can be used. Examples of the bluing agent include MACROLEX Violet manufactured by Bayer AG, Diaresin Violet and Diaresin Blue manufactured by Mitsubishi Chemical Corporation, and Tetrazole Blue manufactured by Sandoz K.K. Of those, MACROLEX Violet is preferred. Further, the addition amount of the colorant is preferably 0.00001 to 0.01 part by mass, or more preferably 0.0001 to 0.001 part by mass with respect to 100 parts by mass of the combination including the component (A) and the component (B).

Note that the compounds exemplified above can be used as the silane coupling agent.

A method of preparing the flame-retardant PC resin composition of the present invention is not particularly limited, and a conventionally known method can be adopted. To be specific, the composition can be prepared by: blending (a-1) the general PC resin and (a-2) the PC-POS copolymer, which are included in the the aromatic polycarbonate resin as the component (A), the glass filler as the component (B), the reactive functional group-containing silicone compound as the component (C), and the above various arbitrary components to be used as required at a predetermined ratio; and kneading the mixture.

The blending and the kneading are performed by a method using, for example, a ribbon blender and a drum tumbler for a preparing mixing, a Henschel mixer, a Banbury mixer, a single-screw extruder, a twin-screw extruder, a multi-screw extruder, and a cokneader. Heating temperature in melt-kneading is appropriately selected generally from a range of about 240 to 300° C.

It should be noted that any component to be incorporated other than the aromatic polycarbonate resin can be melted and kneaded with part of the aromatic polycarbonate resin in advance before being added: the component can be added as a master batch.

The flame-retardant PC resin composition of the present invention thus prepared has a flame retardancy determined by evaluation for flame retardancy in conformance with UL94 of 1.5 mmV-0, so the composition has excellent flame retardancy even without using a so-called flame retardant. It should be noted that a flame retardancy evaluation test is described later.

Next, a polycarbonate resin molded article of the present invention is described.

The polycarbonate resin molded article (hereinafter abbreviated to "PC resin molded article") of the present invention is obtained by molding the above-mentioned flame-retardant PC resin composition of the present invention to have a thickness of 0.3 to 10 mm. The thickness of the molded article is appropriately selected from the above range depending on an application of the molded article.

A method of producing the PC resin molded article of the present invention is not particularly limited, and any one of the various conventionally known molding methods such as an injection molding method, an injection compression molding method, an extrusion molding method, a blow molding method, a press molding method, a vacuum molding method, and a foam molding method can be employed; injection molding at a mold temperature of 120° C. or higher is preferable. In this case, a resin temperature in the injection molding is typically about 240 to 300° C., or preferably 260 to 280° C.

Injection molding at a mold temperature of 120° C. or higher, provides, for example, the following merit: the glass filler sinks, so the molded article can obtain a good external appearance. The mold temperature is more preferably 125° C. or higher, or still more preferably 130° C. to 140° C.

The PC resin composition of the present invention as a molding raw material is preferably pelletized by the melting kneading method before being used.

It should be noted that gas injection molding for the prevention of sink marks in the external appearance of the molded article or for a reduction in weight of the molded article can be adopted as an injection molding method.

The optical characteristics of the PC resin molded article of the present invention thus obtained are desirably as follows: the molded article has a total light transmittance for visible light of 80% or more, or preferably 85% or more, a haze value of 40% or less, or preferably 30% or less, and a 60° specular gloss of 90 or more. It should be noted that methods of measuring the optical characteristics will be described later.

In addition, the present invention also provides a method of producing a PC resin molded article characterized by including subjecting the above-mentioned flame-retardant PC resin composition of the present invention to injection molding at a mold temperature of 120° C. or higher to produce a molded article having a thickness of 0.3 to 10 mm.

The flame-retardant PC resin composition of the present invention contains the glass filler having a refractive index close to that of the aromatic polycarbonate resin, is excellent in, for example, transparency, mechanical strength, impact resistance, and heat resistance, and is provided with high flame retardancy even without using a flame retardant. The PC resin molded article of the present invention obtained by using the composition is excellent in, for example, transparency, flame retardancy, mechanical strength, impact resistance, and heat resistance.

The PC resin molded article of the present invention is preferably used for the following items, for example:

(1) various parts of televisions, radio cassettes, video cameras, video tape recorders, audio players, DVD players, air conditioners, portable phones, displays, computers, resistors, electric calculators, copying machines, printers, and facsimiles, and electrical/electronic device parts such as outside plates and housing materials;
(2) parts for precision apparatuses such as cases and covers of precision apparatuses such as PDA's, cameras, slide projectors, clocks, gages, display apparatuses;
(3) parts for automobiles such as automobile interior materials, exterior products, and automobile body parts including instrument panels, upper garnishes, radiator grills, speaker grills, wheel covers, sunroofs, head lump reflectors, door visors, spoilers, rear windows, and side windows; and
(4) parts for furniture such as chairs, tables, desks, blinds, lighting covers, and interior instruments.

EXAMPLES

Hereinafter the present invention is described in more detail by way of examples, but the present invention is not limited thereto.

It should be noted that a test piece was molded out of a PC resin composition pellet obtained in each example as described below, and was evaluated for various characteristics.
(1) Mechanical Characteristics A pellet was subjected to injection molding with a 100-t injection molding machine [manufactured by TOSHIBA MACHINE CO., LTD., device name "IS100E"] at a mold temperature of 130° C. and a resin temperature of 280° C., whereby respective test pieces each having a predetermined form were produced.

The tensile characteristics (breaking strength and breaking elongation) of each test piece were measured in conformance with ASTM D638, and the flexural characteristics (flexural strength and flexural modulus) of the test piece were measured in conformance with ASTM 790. In addition, the Izod impact strength of the test piece was measured in conformance with ASTM D256, the deflection temperature of the test piece was measured in conformance with ASTM D648, and the specific gravity of the test piece was measured in conformance with ASTM D792.
(2) Flame Retardancy A pellet was subjected to injection molding with a 45-t injection molding machine [manufactured by TOSHIBA MACHINE CO., LTD., device name "IS45PV"] at a mold temperature of 130° C. and a resin temperature of 280° C., whereby a test piece measuring 127×12.7×1.5 mm was produced. The flame retardancy of the test piece was measured in conformance with Underwriters Laboratories Subject 94 (UL94).
(3) Optical Characteristics A pellet was subjected to injection molding with a 45-t injection molding machine [manufactured by TOSHIBA MACHINE CO., LTD., device name "IS45PV"] at a mold temperature of 130° C. and a resin temperature of 280° C., whereby a test piece measuring 30×40×2 mm was produced. The haze value and the total light transmittance of the test piece were measured with a fully-automatic direct-reading haze computer [manufactured by Suga Test Instruments Co., Ltd., device name "HGM-2DP" (C light source)] in conformance with JIS K 7105. The 60° specular gloss of the test piece was measured with a glossmeter [manufactured by Nippon Denshoku Kogyo Co., Ltd., device name "VGS-Σ901"] in conformance with JIS K 7105.

In addition, the kinds of the respective components used in the production of each flame-retardant PC resin composition pellet are shown below.
(1) General PC resin; bisphenol A polycarbonate having a viscosity average molecular weight of 22,500 [manufactured by Idemitsu Kosan Co., Ltd., trade name "TARFLON FN2200A", refractive index 1.585]
(2) PC-PDMS copolymer; a polydimethylsiloxane (PDMS) copolymer bisphenol A polycarbonate resin having a viscosity average molecular weight of 15,000, a content of PDMS moiety of 4 mass %, a chain length of PDMS moiety (n) of 30, and a refractive index of 1.584.
(3) Refractive index-improved GF1; glass fibers each including a chopped strand having a refractive index of 1.584 and a specific gravity of 2.70, and measuring φ13 μm×3 mm [manufactured by ASAHI FIBER GLASS Co., Ltd., glass composition: $SiO_2$ 52.6 mass %, $Al_2O_3$ 13.3 mass %, CaO 21.8 mass %, $TiO_2$ 5.9 mass %, $B_2O_3$ 5.9 mass %, MgO 0.5 mass %]
(4) Refractive index-improved GF2; milled fibers obtained by milling the glass fibers each including a chopped strand having a refractive index of 1.584 and a specific gravity of 2.70, and measuring φ13 μm×3 mm [manufactured by ASAHI FIBER GLASS Co., Ltd., glass composition is the same as the item (3)]
(5) GF1; glass fibers each including a chopped strand which is made of an E glass having a refractive index of 1.555 and a specific gravity of 2.54, and measuring φ13 μm×3 mm [manufactured by ASAHI FIBER GLASS Co., Ltd., trade name "03MA409C", glass composition: $SiO_2$ 55.4 mass %, $Al_2O_3$ 14.1 mass %, CaO 23.2 mass %, $B_2O_3$ 6.0 mass %, MgO 0.4 mass %, $Na_2O+K_2O+Li_2O$=0.7 mass %, $Fe_2O_3$ 0.2 mass %, $F_2$ 0.6 mass %]
(6) Stabilizer 1; octadecyl 3-(3,5-di-tert-butyl-4-hydroxyphenyl)propionate [manufactured by Ciba Specialty Chemicals Inc., trade name "Irganox 1076"]
(7) Stabilizer 2; tris(2,4-di-tert-butylphenyl)phosphite [manufactured by Ciba Specialty Chemicals Inc., trade name "Irgafos 168"]
(8) Release agent; pentaerythritol tetrastearate [manufactured by RIKEN VITAMIN CO., LTD., trade name "EW440A"]
(9) Flame retardant assistant 1; a reactive silicone compound having a refractive index of 1.51 and having a vinyl group and a methoxy group as functional groups [manufactured by Shin-Etsu Chemical Co., Ltd., trade name "KR-219"]
(10) Flame retardant assistant 2; a reactive silicone compound having a refractive index of 1.49 and having a vinyl group and a methoxy group as functional groups [manufactured by Dow Corning Corporation, trade name "DC3037"]
(11) Flame retardant assistant 3; polytetrafluoroethylene resin [manufactured by ASAHI Fluoropolymer trade name "CD076"]
(12) Colorant; MACROLEX Violet [manufactured by Bayer AG]

Examples 1 to 8 and Comparative Examples 1 to 6

In each of the examples and the comparative examples, the respective components were mixed at a blending ratio shown in Table 1, and the mixture was melted and kneaded with a biaxial extruder [manufactured by TOSHIBA MACHINE CO., LTD., device name "TEM-35B"] at 280° C., whereby a flame-retardant PC resin composition pellet was produced.

A test piece was molded out of each pellet as described above, and its mechanical characteristics, flame retardancy, and optical characteristics were determined. Table 1 shows the results.

TABLE 1

|  |  | Example | | | | | | |
|---|---|---|---|---|---|---|---|---|
|  |  | 1 | 2 | 3 | 4 | 5 | 6 | 7 |
| PC resin composition (part(s) by mass) | General PC resin | 67.5 | 67.5 | 60.0 | 52.5 | 52.5 | 45.0 | 60.0 |
|  | PC-PDMS copolymer | 22.5 | 22.5 | 20.0 | 17.5 | 17.5 | 15.0 | 20.0 |
|  | Refractive index-improved GF1 | 10.0 | 10.0 | 20.0 | 30.0 | 20.0 | 40.0 | 20.0 |
|  | Refractive index-improved GF2 | — | — | — | — | 10.0 | — | — |
|  | GF1 | — | — | — | — | — | — | — |
|  | Stabilizer 1 | 0.1 | 0.1 | 0.1 | 0.1 | 0.1 | 0.1 | 0.1 |
|  | Stabilizer 2 | 0.1 | 0.1 | 0.1 | 0.1 | 0.1 | 0.1 | 0.1 |
|  | Release agent | 0.8 | 0.8 | 0.8 | 0.8 | 0.8 | 0.8 | 0.8 |
|  | Flame retardant assistant 1 | 0.3 | — | 0.3 | 0.3 | 0.3 | 0.3 | 0.3 |
|  | Flame retardant assistant 2 | — | 0.5 | — | — | — | — | — |
|  | Flame retardant assistant 3 | — | — | — | — | — | — | — |
|  | Colorant | — | — | — | — | — | — | — |
| Difference between refractive index of PC resin and refractive index of GF | | 0.001 | 0.001 | 0.001 | 0.001 | 0.001 | 0.001 | 0.001 |
| Mechanical characteristics | Tensile breaking strength (MPa) | 80 | 100 | 100 | 115 | 110 | 127 | 100 |
|  | Tensile elongation (%) | 5 | 4 | 4 | 3 | 4 | 2 | 4 |
|  | Flexural strength (MPa) | 120 | 140 | 140 | 170 | 150 | 180 | 140 |
|  | Flexural modulus (MPa) | 3,900 | 5,900 | 5,900 | 8,400 | 6,100 | 10,800 | 5,900 |
|  | Izod impact strength [with notches] (kJ/m$^2$) | 10 | 14 | 14 | 15 | 14 | 15 | 15 |
|  | Deflection temperature (° C.) | 141 | 142 | 142 | 144 | 143 | 144 | 141 |
|  | Specific gravity | 1.27 | 1.33 | 1.33 | 1.42 | 1.42 | 1.52 | 1.33 |
| Flame retardancy | UL-94 [test piece thickness: 1.5 mm] | V-0 | V-0 | V-0 | V-0 | V-0 | V-0 | V-0 |
| Optical characteristics [T = 2 mm] | Total light transmittance (%) | 88 | 87 | 86 | 85 | 85 | 84 | 86 |
|  | Haze value (%) | 12 | 12 | 18 | 24 | 19 | 29 | 18 |
|  | 60° specular gloss | 119 | 119 | 110 | 99 | 106 | 91 | 110 |

|  |  | Example | Comparative Example | | | | | |
|---|---|---|---|---|---|---|---|---|
|  |  | 8 | 1 | 2 | 3 | 4 | 5 | 6 |
| PC resin composition (part(s) by mass) | General PC resin | 60.0 | 80.0 | 60.0 | 60.0 | 67.5 | 45.0 | 67.5 |
|  | PC-PDMS copolymer | 20.0 | — | 20.0 | 20.0 | 22.5 | 15.0 | 22.5 |
|  | Refractive index-improved GF1 | 20.0 | 20.0 | 20.0 | 20.0 | — | — | — |
|  | Refractive index-improved GF2 | — | — | — | — | — | — | — |
|  | GF1 | — | — | — | — | 10.0 | 40.0 | 10.0 |
|  | Stabilizer 1 | 0.1 | 0.1 | 0.1 | 0.1 | 0.1 | 0.1 | 0.1 |
|  | Stabilizer 2 | 0.1 | 0.1 | 0.1 | 0.1 | 0.1 | 0.1 | 0.1 |
|  | Release agent | 0.8 | 0.8 | 0.8 | 0.8 | 0.8 | 0.8 | 0.8 |
|  | Flame retardant assistant 1 | 0.3 | — | — | — | 0.3 | 0.3 | 0.3 |
|  | Flame retardant assistant 2 | — | — | — | — | — | — | — |
|  | Flame retardant assistant 3 | — | — | — | 0.3 | — | — | — |
|  | Colorant | 0.001 | — | — | — | — | — | 0.001 |
| Difference between refractive index of PC resin and refractive index of GF | | 0.001 | 0.001 | 0.001 | 0.001 | 0.030 | 0.030 | 0.030 |
| Mechanical characteristics | Tensile breaking strength (MPa) | 100 | 100 | 100 | 100 | 80 | 127 | 80 |
|  | Tensile elongation (%) | 4 | 4 | 4 | 4 | 5 | 2 | 5 |
|  | Flexural strength (MPa) | 140 | 140 | 140 | 140 | 120 | 180 | 120 |
|  | Flexural modulus (MPa) | 5,900 | 5,900 | 5,900 | 5,900 | 3,900 | 10,800 | 3,900 |
|  | Izod impact strength [with notches] (kJ/m$^2$) | 15 | 14 | 14 | 14 | 10 | 15 | 10 |
|  | Deflection temperature (° C.) | 141 | 142 | 142 | 142 | 141 | 144 | 141 |
|  | Specific gravity | 1.33 | 1.33 | 1.33 | 1.33 | 1.27 | 1.52 | 1.27 |
| Flame retardancy | UL-94 [test piece thickness: 1.5 mm] | V-0 | V-2 out | V-0 | V-1 | V-0 | V-0 | V-0 |
| Optical characteristics [T = 2 mm] | Total light transmittance (%) | 86 | 86 | 54 | 86 | 43 | 18 | 43 |
|  | Haze value (%) | 18 | 18 | 79 | 18 | 91 | 94 | 91 |
|  | 60° specular gloss | 110 | 110 | 81 | 110 | 72 | 53 | 72 |

Note:
"Difference between refractive index of PC resin and refractive index of GF" represents a difference between the refractive index of the total of general PC resin and PC-PDMS copolymer and the refractive index of refractive index-improved GF1 and/or refractive index-improved GF2 or of GF1.

Table 1 shows the following.

Examples 1 to 8 show that, when a reactive functional group-containing silicone compound is added to a combination formed of a PC resin (the total of the general PC resin and the PC-PDM copolymer) and a glass filler having a refractive index smaller or larger than that of the PC resin by 0.002 or less, the resultant resin composition can be provided with excellent flame retardancy while maintaining its transparency, strength, and heat resistance.

Comparative Example 1 shows an example of a combination formed of the PC resin and the glass filler having a refractive index smaller or larger than that of the PC resin by 0.002 or less, in which the copolymer with organosiloxane is not contained in the PC resin and to which the reactive functional group-containing silicone compound is not added. In this case, the resultant resin composition can maintain its transparency, strength, and heat resistance, but cannot be provided with flame retardancy.

Comparative Example 2 shows the case of a combination formed of the PC resin and the glass filler having a refractive index smaller or larger than that of the PC resin by 0.002 or less, to which a polytetrafluoroethylene resin as a dripping inhibitor is added. In this case, the resultant resin composition can maintain its flame retardancy, strength, and heat resistance, but cannot be provided with sufficient transparency.

Comparative Example 3 shows that, in the case where the reactive functional group-containing silicone compound is not added to the combination formed of the PC resin and the glass filler having a refractive index smaller or larger than that of the PC resin by 0.002 or less, the resultant resin composition can maintain its transparency, strength, and heat resistance, but cannot be provided with sufficient flame retardancy.

Comparative Examples 4 to 6 each show that, in the case where the reactive functional group-containing silicone compound is added to a combination formed of the PC resin and a glass filler made of the E glass (refractive index: 1.555), the resultant resin composition can be provided with flame retardancy while maintaining its strength and heat resistance, but cannot maintain its transparency.

INDUSTRIAL APPLICABILITY

The flame-retardant PC resin composition of the present invention contains the glass filler having a refractive index close to that of the aromatic polycarbonate resin, is excellent in, for example, transparency, mechanical strength, impact resistance, and heat resistance, and is provided with high flame retardancy even without using a flame retardant. The PC resin molded article of the present invention obtained by using the composition can suitably find applications in various fields.

The invention claimed is:

1. A flame-retardant polycarbonate resin composition comprising:
   (A) 55 to 95 mass % of an aromatic polycarbonate resin containing a polycarbonate-polyorganosiloxane copolymer,
   (B) 45 to 5 mass % of a glass filler having a refractive index smaller or larger than a refractive index of the aromatic polycarbonate resin by 0.002 or less, and
   (C) 0.05 to 2.0 parts by mass of a silicone compound having a reactive functional group with respect to 100 parts by mass of the combination.

2. The flame-retardant polycarbonate resin composition according to claim 1, wherein the aromatic polycarbonate resin as the component (A) contains 10 to 40 mass % of the polycarbonate-polyorganosiloxane copolymer.

3. The flame-retardant polycarbonate resin composition according to claim 1, wherein the polycarbonate-polyorganosiloxane copolymer contains a polyorganosiloxane moiety in a ratio of 0.3 to 5.0 mass %.

4. The flame-retardant polycarbonate resin composition according to claim 1, wherein the glass filler as the component (B) comprises glass fibers, milled fibers or combination thereof.

5. The flame-retardant polycarbonate resin composition according to claim 1, comprising 0.00001 to 0.01 part by mass of a colorant with respect to 100 parts by mass of the combined mass of (A) and (B).

6. A polycarbonate resin molded article produced by molding the flame-retardant polycarbonate resin composition according to claim 1 to have a thickness of 0.3 to 10 mm.

7. The polycarbonate resin molded article according to claim 6, wherein the polycarbonate resin molded article is produced by injection molding at a mold temperature of 120° C. or higher.

8. The polycarbonate resin molded article according to claim 6, wherein the polycarbonate resin molded article has a total light transmittance for visible light of 80% or more and a haze value of 40% or less.

9. The polycarbonate resin molded article according to claim 6, wherein the polycarbonate resin molded article has a 60° specular gloss of 90 or more.

10. A method for producing a polycarbonate resin molded article, comprising subjecting the flame-retardant polycarbonate resin composition according to claim 1 to injection molding at a mold temperature of 120° C. or higher to produce a molded product having a thickness of 0.3 to 10 mm.

11. A flame-retardant polycarbonate resin composition comprising:
   (A) 55 to 95 mass % of an aromatic polycarbonate resin containing a polycarbonate-polyorganosiloxane copolymer,
   (B) 45 to 5 mass % of a glass filler having a refractive index smaller or larger than a refractive index of the aromatic polycarbonate resin by 0.002 or less, and
   (C) 0.05 to 2.0 parts by mass of a silicone compound having a reactive functional group with respect to 100 parts by mass of the combination,
   wherein the composition is free of halogens.

12. The flame-retardant polycarbonate resin composition according to claim 11, wherein the aromatic polycarbonate resin as the component (A) contains 10 to 40 mass % of the polycarbonate-polyorganosiloxane copolymer.

13. The flame-retardant polycarbonate resin composition according to claim 11 wherein the polycarbonate-polyorganosiloxane copolymer contains a polyorganosiloxane moiety in a ratio of 0.3 to 5.0 mass %.

14. The flame-retardant polycarbonate resin composition according to claim 11, wherein the glass filler as the component (B) comprises glass fibers, milled fibers or combination thereof.

15. The flame-retardant polycarbonate resin composition according to claim 11, comprising 0.00001 to 0.01 part by mass of a colorant with respect to 100 parts by mass of the combined mass of (A) and (B).

16. A polycarbonate resin molded article produced by molding the flame-retardant polycarbonate resin composition according to claim 11 to have a thickness of 0.3 to 10 mm.

17. The polycarbonate resin molded article according to claim 16, wherein the polycarbonate resin molded article is produced by injection molding at a mold temperature of 120° C. or higher.

18. The polycarbonate resin molded article according to claim 16, wherein the polycarbonate resin molded article has a total light transmittance for visible light of 80% or more and a haze value of 40% or less.

19. The polycarbonate resin molded article according to claim 16, wherein the polycarbonate resin molded article has a 60° specular gloss of 90 or more.

20. A method for producing a polycarbonate resin molded article, comprising subjecting the flame-retardant polycarbonate resin composition according to claim 11 to injection molding at a mold temperature of 120° C. or higher to produce a molded product having a thickness of 0.3 to 10 mm.

21. The flame-retardant polycarbonate resin composition according to claim 1, wherein the glass filer is at least one of a Glass I comprising:

50-60 mass % $SiO_2$,
10-15 mass % $Al_2O_3$,
15-25 mass % CaO,
2-10 mass % $TiO_2$,
2-8 mass % $B_2O_3$,
0-5 mass % MgO,
0-5 mass % ZnO,
0-5 mass % BaO,
0-4 mass % $ZrO_2$,
0-2 mass % $Li_2O$,
0-2 mass % $Na_2O$,
0-2 mass % $K_2O$,
wherein the Glass I has a total content of $Li_2O$, $Na_2O$ and $K_2O$ is from 0 to 2 mass %; and
a Glass II comprising:
50-60 mass % $SiO_2$,
10-15 mass % $Al_2O_3$,
15-25 mass % CaO,
2-10 mass % $TiO_2$,
0-5 mass % MgO,
0-5 mass % ZnO,
0-5 mass % BaO,
2-5 mass % $ZrO_2$,
0-2 mass % $Li_2O$,
0-2 mass % $Na_2O$,
0-2 mass % $K_2O$,
wherein the Glass II is substantially free of $B_2O_3$ and has a total content of $Li_2O$, $Na_2O$ and $K_2O$ is from 0 to 2 mass %.

22. A flame-retardant polycarbonate resin composition comprising:
(A) 55 to 95 mass % of an aromatic polycarbonate resin containing a polycarbonate-polyorganosiloxane copolymer,
(B) 45 to 5 mass % of a glass filler having a refractive index smaller or larger than a refractive index of the aromatic polycarbonate resin by 0.002 or less, and
(C) 0.05 to 2.0 parts by mass of a silicone compound having a reactive functional group with respect to 100 parts by mass of the combination,
wherein the composition does not include a flame retardant.

* * * * *